United States Patent
Xu et al.

(10) Patent No.: US 9,715,640 B2
(45) Date of Patent: Jul. 25, 2017

(54) ROBUST GRAPH REPRESENTATION AND MATCHING OF RETINA IMAGES

(71) Applicant: AGENCY FOR SCIENCE, TECHNOLOGY AND RESEARCH, Singapore (SG)

(72) Inventors: Yanwu Xu, Singapore (SG); Jiang Liu, Singapore (SG); Wing Kee Damon Wong, Singapore (SG); Ngan Meng Tan, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 93 days.

(21) Appl. No.: 14/404,445

(22) PCT Filed: Jun. 3, 2013

(86) PCT No.: PCT/SG2013/000229
§ 371 (c)(1),
(2) Date: Nov. 26, 2014

(87) PCT Pub. No.: WO2013/180660
PCT Pub. Date: Dec. 5, 2013

(65) Prior Publication Data
US 2015/0186752 A1 Jul. 2, 2015

(30) Foreign Application Priority Data
Jun. 1, 2012 (SG) ................ 201204044-0

(51) Int. Cl.
*G06K 9/00* (2006.01)
*G06K 9/62* (2006.01)
(Continued)

(52) U.S. Cl.
CPC .......... *G06K 9/6215* (2013.01); *G06F 21/32* (2013.01); *G06K 9/0061* (2013.01);
(Continued)

(58) Field of Classification Search
None
See application file for complete search history.

(56) References Cited

U.S. PATENT DOCUMENTS 7,327,860 B2 * 2/2008 Derakhshani ...... G06K 9/00597
382/117
7,668,351 B1 * 2/2010 Soliz .................... G06T 7/0091
351/237

(Continued)

OTHER PUBLICATIONS

Deng et al., "Retinal Fundus Image Registration via Vascular Structure Graph Matching", International Journal of Biomedical Imaging, vol. 2010, pp. 1-13.*
Tang et al., "Splat Feature Classification: Detection of the Presence of Large Retinal Hemorrhages", 2011 IEEE International Symposium on Biomedical Imaging: From Nano to Macro, 2011, pp. 681-684.*

(Continued)

*Primary Examiner* — Matthew Bella
*Assistant Examiner* — Jose M Torres
(74) *Attorney, Agent, or Firm* — Blakely, Sokoloff, Taylor & Zafman LLP

(57) ABSTRACT

A numerical parameter indicative of the degree of match between two retina images is produced by comparing two graphs obtained from the respective images. Each graph is composed of edges and vertices. Each vertex is associated with a location the corresponding retina image, and with descriptor data describing a part of the corresponding retina image proximate the corresponding location.

19 Claims, 4 Drawing Sheets

(51) Int. Cl.
*G06K 9/32* (2006.01)
*G06F 21/32* (2013.01)
*G06K 9/46* (2006.01)

(52) U.S. Cl.
CPC ..... *G06K 9/00597* (2013.01); *G06K 9/00604* (2013.01); *G06K 9/00617* (2013.01); *G06K 9/4604* (2013.01); *G06K 9/469* (2013.01); *G06K 9/4642* (2013.01)

(56) References Cited

U.S. PATENT DOCUMENTS

| | | | | |
|---|---|---|---|---|
| 7,769,209 | B2* | 8/2010 | Komura | G06K 9/00885 340/5.53 |
| 8,340,437 | B2* | 12/2012 | Abramoff | G06K 9/6231 382/165 |
| 2005/0182327 | A1 | 8/2005 | Petty et al. | |
| 2005/0281440 | A1* | 12/2005 | Pemer | A61B 3/1216 382/117 |
| 2007/0258630 | A1 | 11/2007 | Tobin et al. | |
| 2010/0128117 | A1* | 5/2010 | Dyer | G06K 9/00604 348/78 |
| 2012/0027275 | A1* | 2/2012 | Fleming | G06F 19/321 382/128 |
| 2012/0163678 | A1* | 6/2012 | Du | G06K 9/0061 382/117 |
| 2012/0177262 | A1* | 7/2012 | Bhuiyan | G06T 7/0046 382/128 |
| 2014/0025607 | A1* | 1/2014 | Wang | G06F 17/30247 706/12 |

OTHER PUBLICATIONS

Aguilar et al., "A robust Graph Transformation Matching for non-rigid registration", Image and Vision Computing 27 (2009) pp. 897-910.*
PCT Notification of Transmittal of the International Search Report and the Written Opinion of the International Searching Authority, or the Declaration, for PCT Counterpart Application No. PCT/SG2013/000229, 9 pages, (Aug. 12, 2013).
Dakshina Ranjan Kisku, et al., "Face Recognition using SIFT Descriptor under Multiple Paradigms of Graph Similarity Constraints", International Journal of Multimedia and Ubiquitous Engineering, vol. 5, No. 4, 18 pages, (Oct. 2010).
K. Mikolajczyk, et al., "A Comparison of Affine Region Detectors", International Journal of Computer Vision, 30 pages, (2005).
Alex Levinshtein, et al., "TurboPixels: Fast Superpixels Using Geometric Flows", IEEE Transactions on Pattern Analysis and Machine Intelligence, vol. 31, No. 12, pp. 2290-2297, (Dec. 2009).
Radhakrishna Achanta, et al., "SLIC Superpixels", École Polytechnique Fédrale de Lausanne (EPFL) Technical Report, 15 pages, (2010).
Yanwu Xu, et al., "Efficient Optic Cup Detection from Intra-Image Learning with Retinal Structure Priors", International Conference on Medical Image Computing and Computer-Assisted Intervention (MICCAI), 8 pages, (2012).
David G. Lowe, "Object Recognition from Local Scale-Invariant Features", IEEE Proceedings of the International Conference on Computer Vision, 8 pages, (Sep. 1999).

* cited by examiner

ROBUST GRAPH REPRESENTATION AND MATCHING OF RETINA IMAGES

CROSS-REFERENCE TO RELATED APPLICATIONS

This patent application is a U.S. National Phase Application under 35 U.S.C. §371 of International Application No. PCT/SG2013/000229, filed Jun. 3, 2013, entitled ROBUST GRAPH REPRESENTATION AND MATCHING OF RETINA IMAGES, which claims priority to Singapore Patent Application No. 201204044-0, filed Jun. 1, 2012.

FIELD OF THE INVENTION

The present invention relates to methods and apparatus for matching retina images, for example to identify whether a newly received retina image is of the same eye as a pre-stored retina image.

BACKGROUND OF THE INVENTION

The retina is the neural part of the eye responsible for vision and the pattern of blood vessels serving the retina is as unique as a fingerprint, so it is also called an 'eye print'. The idea for retinal identification was first conceived by Dr. Carleton Simon and Dr. Isadora Goldstein and was published in 1935 but the technology used to exploit this information was developed much later. By 1985 retinal scan technology became available for computerized biometric identification and commercial security use.

Retinal scans are just one of the biometric methods using the eye for personal identification. Retina is more reliable and much harder to tamper compared with other biometrics such as fingerprints, face, hand, voice and signature.

SUMMARY OF THE INVENTION

The present invention aims to provide new and useful systems for matching two retina images, for example to determine if the images are of the same eye.

In general terms, the present invention proposes that a numerical parameter indicative of the degree of match between two retina images is produced by comparing two graphs obtained from the respective images. Each graph is composed of edges and vertices. Each vertex is associated with a location in the corresponding retina image, and with descriptor data describing a part of the corresponding retina image proximate the corresponding location.

Embodiments of the invention may have following features: 1) high accuracy with only one-shot retina image capture; 2) not only using blood vessel pattern but also other information included in a person's retina image; 3) having no need of image alignment or registration; 4) being insensitive to illumination change, scale change and/or rotation.

This technique can be used for personal identification and recognition; it also can be used to obtain information indicative of the presence of an illness, in order to suggest that more detailed experimentation is carried out and/or to suggest a specific treatment. In some embodiments of the invention, the output of the method can be treated as a risk index value, which a doctor can take into account to make a diagnosis. However, other uses of the invention (particular those not carried out in a hospital) are not part of a process to reach an immediate diagnosis, but rather for screening (e.g. of a large number of people), such that those who have a risk index value above a certain threshold (which may be suggestive of the presence of any of multiple disease states) can be referred for further testing.

For example, the risk index value may be elevated in individuals suffering from AMD (age-related macular degeneration) or glaucoma. For the AMD disease, suggested treatment includes medication (e.g., Ranibizumab), and an operation (please refer to http://www.mayoclinic.com/health/wet-macular-deqeneration/DS01086/DSECTION=treatments-and-drugs); for glaucoma, the suggested treatment includes medication and an operation (please refer to http://www.mayoclinic.com/health/glaucoma/DS00283/DSECTION=treatments-and-drugs).

The embodiments of the present invention typically comprise the following features:
A retina image is represented by a graph;
The graph representation is generated by:
Using existing algorithms for over-segmentation to divide the retina image into regions (super-pixels);
Using existing affine transform invariant point detectors to detect interest points in each super-pixel;
Selecting interest points in each super-pixel with highest transform invariant scores;
Centralising (i.e. centrally aligning) selected points, with each point described as a 128-dimensional SIFT vector with its location expressed in either 2D (images) or 3D (videos) coordinates; and
Optionally deriving a connectivity between super-pixels, and connecting the selected points based on the connectivity between super-pixels. One motivation for doing this is that other retina image matching techniques employ matching of blood vessels with some success, so if the embodiment uses a connectivity defined based on blood vessels, that is expected to improve the success of the embodiment, particularly for disease diagnosis;
The similarity between two retina images is measured by matching the corresponding graph representation of the retina images. This is performed by:
Vertex pair similarity computation by computing the similarity of a correspondence between a vertex pair;
Edge pair similarity computation, similar to the way vertex pair similarity computation is calculated;
Sub-graph matching; and
Graph similarity computation.

BRIEF DESCRIPTION OF THE FIGURES

Embodiments of the invention will now be described for the sake of example only with reference to the following drawings, in which.

DETAILED DESCRIPTION OF THE EMBODIMENTS

Figure 1:
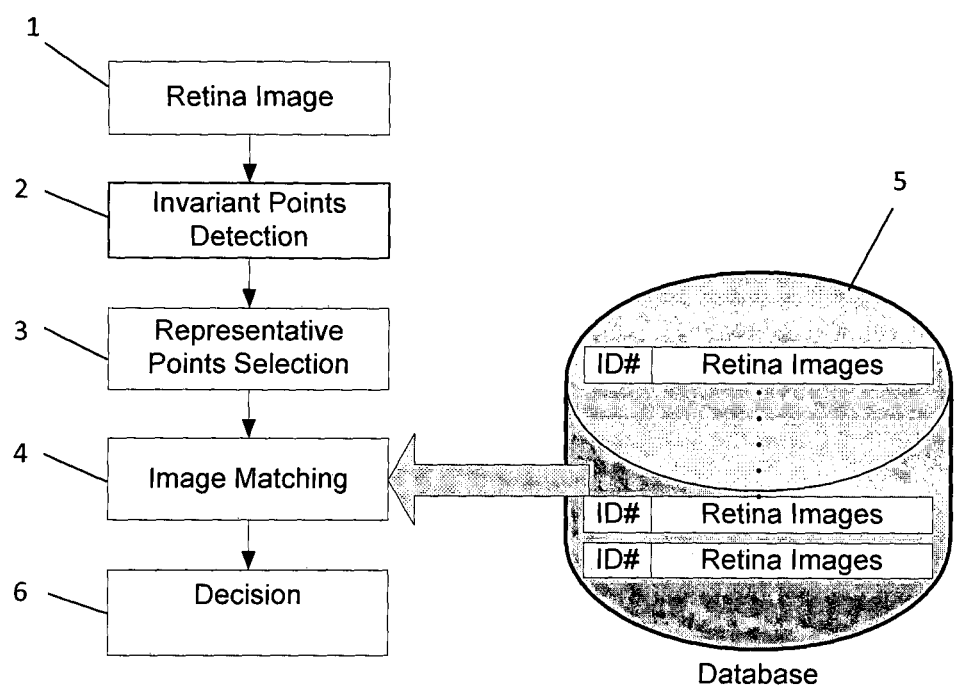
FIG. 1 is a flow chart of a first embodiment of the invention for personal identification and verification.

Referring firstly to FIG. 1, the workflow of a first embodiment of the invention is shown. This embodiment is for identification/recognition of a person. During the process, as described in detail below, pairs of retina images are compared. Such a comparison is referred to as a "test". The starting point is a retina image 1 of the person. This is typically a single non-stereo photograph captured by a fundus camera. Although the description below assumes that there is only one retina image 1, in fact there may be multiple retina images for a single person. The retina image 1 may even be replaced by one or more video sequences in which each frame is a single retina photograph. This is referred to here as a three-dimensional (3d) retina image.

In steps 2 and 3, the retina image is converted into a robust graph representation, by a process which will be explained below in more detail with reference to FIG. 3. In summary, the process involves detecting points which are invariant under an affine transformation (step 2), selecting certain ones of those invariant points (step 3), and generating a graph composed of those points and lines connecting them. Each of the points is associated with a respective set of numerical values called a descriptor.

The graph produced is compared in an image matching step 4 with corresponding graphs obtained from one or more reference images. The graphs are stored in a database 5 (alternatively, in principle the database 5 could store the reference images themselves, and the step 4 could include generating graphs from them). The result of the comparison is a decision 6, which is the output of the first embodiment.

A first possibility is to use the first embodiment to verify the identity of the person from whom the retina image 1 was captured (i.e. when the person is believed to have a certain identity, the embodiment determines whether this belief is correct or not). In this case, the graph obtained from the retina image 1 is compared with one or more graphs obtained from one or more respective reference image(s) of the person having that identity. A described in more detail below, the comparison produces a similarity value indicative of the similarity of the graphs, and the embodiment makes a yes/no decision 6 according to whether the similarity value is above or below a threshold.

A second possibility is to use the first embodiment to determine whether the person from whom the retina image 1 was captured is one of a plurality of individuals, each associated with an identity number (ID#). In this case, the graph obtained from retina image 1 is compared in step 4 with one or more graphs obtained from one or more respective reference images captured from each of the individuals, to produce a respective similarity value for each individual. The first embodiment determines whether all the similarity values are below the threshold, in which the decision 6 is data indicating that the person is not any of the individuals, but rather is someone unknown. Alternatively, if at least one of the similarity values is above the threshold, the embodiment determines which similarity values is highest, and outputs as decision 6 the identity number (ID#) of the corresponding individual. In other words, the person from whom the retina image 1 was obtained is identified as that individual.

Figure 2:
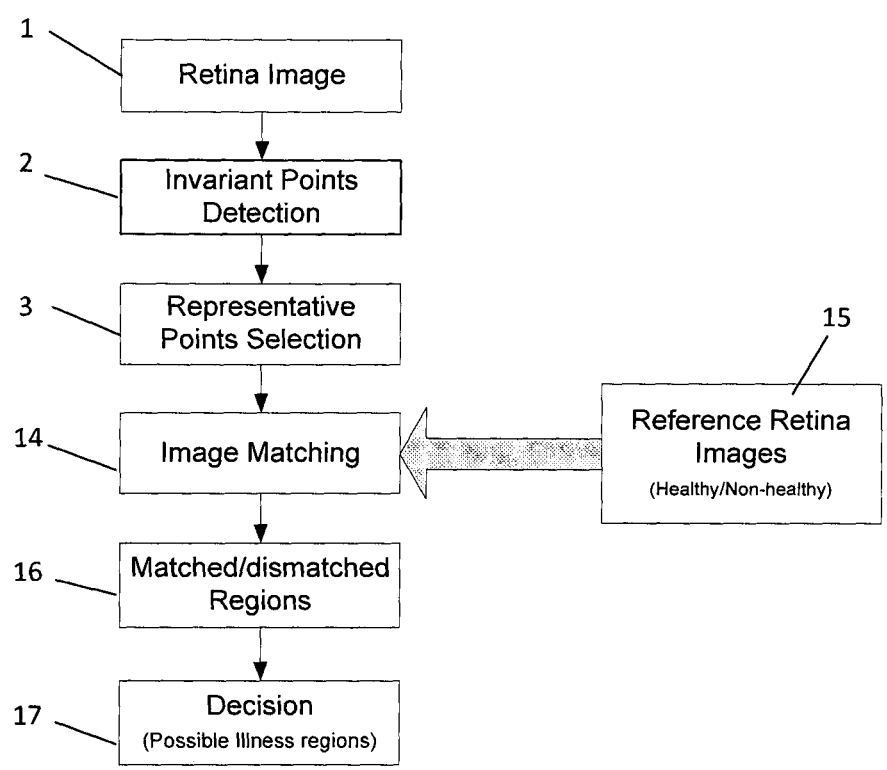
FIG. 2 is a flow chart of a second embodiment of the invention for possible illness region localization.

FIG. 2 is a flow chart of a second embodiment of the invention, which is for performing an eye illness diagnosis. The starting point of the method is again a retina image 1 of a person, and this is converted into a graph by steps 2 and 3 which are the same as in the first embodiment. However, in the second embodiment the image matching step 14 compares the graph with one or more graphs obtained from respective reference images from one or more individuals who are known either to suffer from an eye disease ("non-healthy" individuals) or known not to suffer from an eye disease ("healthy" individuals). Step 14 is carried out in the same way as step 4 (which is described in detail below). The graphs obtained from the reference images are stored in a database 15. Alternatively, in principle the database 15 could store the reference images themselves, and the step 14 could include generating graphs from them.

Alternatively, the database 15 could store graph(s) of one or more retina images (or indeed actually retina images) from the same person from whom the retina image 1 was collected. The former retina images would be images captured at earlier times, e.g. at least a week earlier, at least a month earlier or at least a year earlier. Thus, the matching would indicate regions of the retina image 1 at which changes had occurred.

Optionally, step 14 (which as noted above is performed in the same way as step 4) is performed on a region-by-region basis, instead of on the retina image 1 as a whole. The regions may, for example, be defined based on non-overlapping super-pixels, of the kind described below in the explanation of steps 2 and 3. The output of the step 14 is then data 16 indicating which regions within the retina image 1 which match the reference images ("matched regions"), and regions which do not ("non-matched regions"). From these a decision 17 is made that certain regions provide evidence of the illness.

We now turn to a more detailed discussion of the steps 2 and 3. As described steps 2 and 3 are to produce a robust graph representation of the retina image 1. Preferably, the representation not only captures the vessel pattern but also other distinctive feature points.

Figure 3:
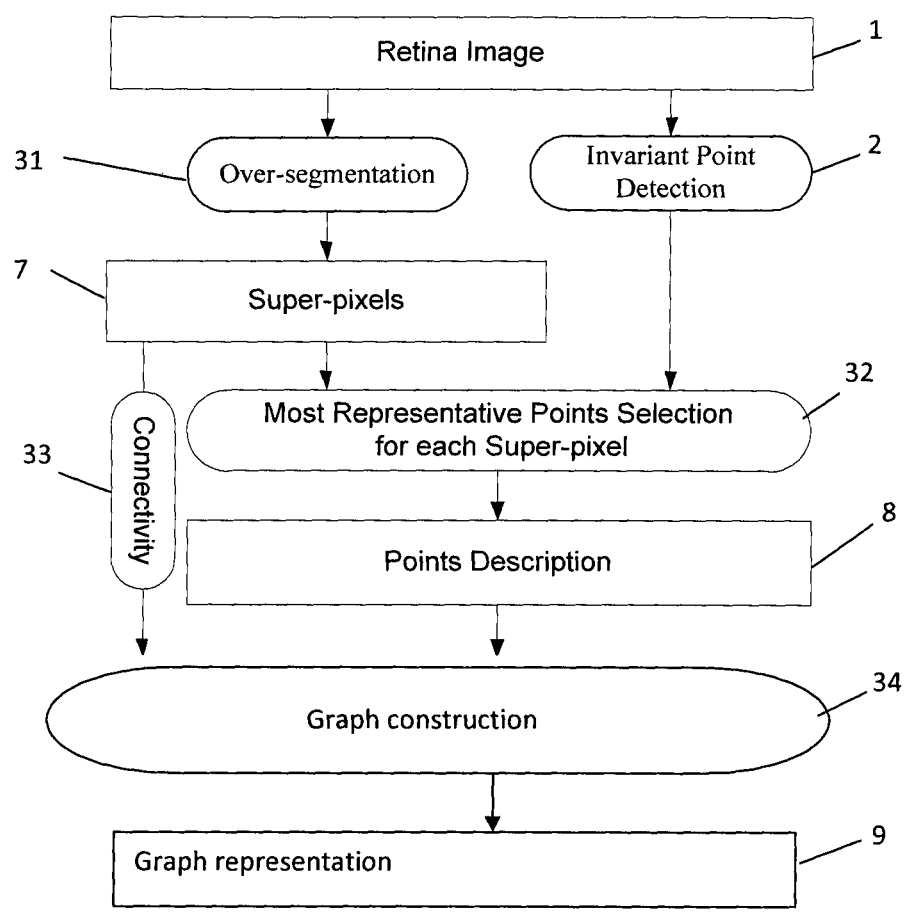
FIG. 3 is a flow chart of a process used by the first and second embodiments of the invention to generate a graph representation of a retina image.

The work flow of obtain the graph representation for a given retina image is illustrated in FIG. 3. In this figure, step 3 of FIGS. 1 and 2 is shown as four sub-steps 31, 32, 33 and 34. The main steps of the flow of FIG. 3 are as follows:

Step 2: using one or more transform invariant point detectors to detect interest points in each super-pixel. The transform invariant point detector generates a transform invariant score for each interest point. One possibility (which was used in our own experiments) is to use affine transform invariant point detectors. Suitable techniques are discussed in K. Mikolajczyk, T. Tuytelaars, C. Schmid, A. Zisserman, J. Matas, F. Schaffalitzky, T. Kadir and L. Van Gool, A comparison of affine region detectors. IJCV, 2005. Another possibility is to use a transform invariant point detector which operates using techniques based on the DoG (difference of Gaussians) disclosed in the paper by David Lowe referred to below.

Step 31: using over-segmentation algorithms to segment the given retina image into αregions (super-pixels). Suitable techniques are described in A. Levinshtein, A. Stere, K. N. Kutulakos, D. J. Fleet, S. J. Dickinson, and K. Siddiqi, TurboPixels: Fast Superpixels Using Geometric Flows, PAMI 2009. A. Levinshtein, A. Stere, K. N. Kutulakos, D. J. Fleet, S. J. Dickinson, and K. Siddiqi, TurboPixels: Fast Superpixels Using Geometric Flows, PAMI 2009; and R. Achanta, A. Shaji, K. Smith, A. Lucchi, P. Fua, and S. Susstrunk, SLIC Superpixels, EPFL Technical Report, 2010 R. Achanta, A. Shaji, K. Smith, A. Lucchi, P. Fua, and S. Susstrunk, SLIC Superpixels, EPFL Technical Report, 2010. Unlike dividing an image into a grid of regular patches, super-pixels have the valuable property of preserving local boundaries.

Step 32: In each region, we identify the interest points which have a transform invariant score above a threshold. The transform may be an affine transform, and the interest points are detected using an affine transform invariant point detector. In our experimental implementation of the embodiment we used Harris-Laplacian (HAR), Hessian-Laplacian (HES) and Maximally Stable Extremal Region (MSER)

detectors. These three detectors produce complementary features: HAR locates corner features, while HES and MSER extract blob features. If the number of points is below a value β, then all these points are selected. Otherwise, the β points having the highest transform invariant scores are selected, selecting at most β interest points in each super-pixel with highest transform invariant scores.

Step 33 an optional step (not used in our own experimental implementation of the embodiment) of determining a connectivity of the super-pixels. For example, the connectivity may be defined based on blood vessel regions. That is, two super-pixels can be treated as connected if they lie on the same blood vessel. In another possibility, the super-pixels can be classified, and then super-pixels in the same class are treated as connected. The classification may for example be according to whether the super-pixels lie in an optic disc or optic cup, or whether they lie on a blood vessel. The classification may be performed by supervised classification (e.g. using a support vector machine, SVM) Suitable techniques are described in Xu Y W, Liu J, Lin S, Xu D, Cheung C Y, Aung T and Wang T Y. Efficient Optic Cup Detection from Intra-Image Learning with Retinal Structure Priors. International Conference on Medical Image Computing and Computer Assisted Intervention (MICCAI) 2012.

Step 34 generating the graph. First, all the most representative points selected in step 32 are centralized (centrally aligned), i.e., the embodiments align the centroid of all these points to (0,0,0). Each point is described with a feature descriptor vector and its location. In the case that the retina image 1 is a single two dimensional image, the location is a two dimensional vector. In the case that the retina image 1 is a 3d image, it is a three dimensional vector (x,y,z). Our experimental implementation of the embodiment was performed using the two-dimensional case, and the descriptor was a 128-dimensional "SIFT descriptor" (where SIFT stands for "scale-invariant feature transform") produced in much the same way as in Lowe, David G. (1999). "Object recognition from local scale-invariant features", *Proceedings of the International Conference on Computer Vision*. 2. pp. 1150-1157 (but note that, as mentioned above, the interest point detector of the embodiment is preferably different from the one used in this paper). However, in fact many other sorts of feature can be used to generate a descriptor. For example, local binary pattern (LBP), histogram of oriented gradients (HOG), and/or colour histogram features.

Second, the selected most representative points are connected by edges according to the determined connectivity between the corresponding super-pixels. In our experimental implementation of the embodiment, for simplicity, a complete graph (every pair of distinct vertices is connected by a unique edge) is used. The obtained graph is the final representation of a given retina image.

We now turn to a discussion of how the comparison step 4 is carried out. The two graphs are denoted as (G,G'), where G=(V,E) where V is a set of vertices and E is a set of edges, and G'=(V',E') where V' is another set of vertices and E' is another set of edges. Considering the first graph G, the set of vertices V is labeled by an integer index i, and the i-th vertex is denoted by $v_i$. The associated respective SIFT descriptor is denoted by $f_i$. Thus $v_i=(x_i,y_i,f_i)$ where $x_i$ and $y_i$ are the co-ordinates of $v_i$ in the two-dimensional plane. E is $\{e_{ij}\}$ where i and j are integers labeling respective vertices of the first graph G, and $e_{ij}=e_{ji}=\{v_i,v_j,l_{ij}\}$ labels the edge from vertex i to vertex j, where length $l_{ij}=\sqrt{(x_i-x_j)^2+(y_i-y_j)^2}$. Similarly, the set of vertices V' of the other graph G', are labeled by an integer index i', and the i'-th vertex is denoted by $v'_{i'}$. Thus, $v_i \in V$ and $v'_{i'} \in V'$.

Figure 4:
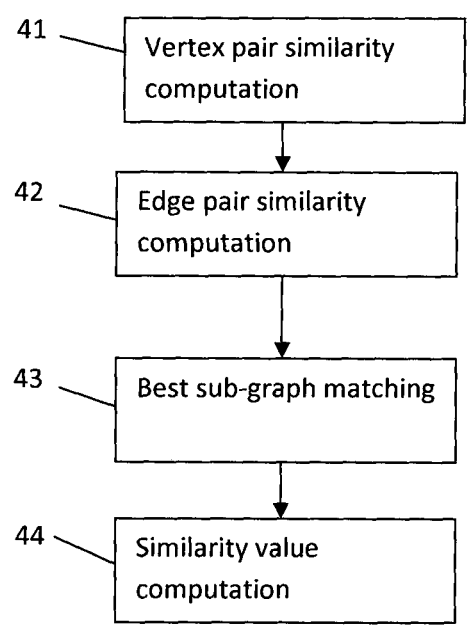
FIG. 4 is a flow chart of a graph comparison process used in the first embodiment.

Since each retina image is represented by a connected graph (which consists of vertices and edges), the similarity of two retina images can be measured by graph matching. In detail, this process consists of following sub-steps shown in FIG. 4:

Sub-step 41: Vertex pair similarity computation: A correspondence $c_i$ denotes a pair of vertices from the respective graphs $(v_i,v'_{i'})$, and the product space $C=V\times V'$ contains all possible correspondences between G and G'. Each correspondence has a corresponding correspondence defined as $$S_{i,i'}^v = \exp\left(-\frac{(f_i - f_j)^2}{2\sigma_f^2}\right)$$

where $\sigma_f$ is a real valued parameter to take into account noise in the features.

In principle, it would be possible to employ all possible correspondences. However, since proper correspondences usually have similar features, the embodiments only consider a smaller space $\zeta=\{c|c\in C, S_{i,i'}^v>\epsilon\}$, to balance the accuracy and speed. Here $\epsilon$ which is no less than zero, denotes an adaptive threshold, $\epsilon$ will automatically reduce to 0 with a small step to guarantee enough candidate correspondences are chosen for post-processing. This is similar to the process by which the β points are chosen in each super-pixel. The result is that the correspondences with the highest similarity scores are chosen.

Sub-step 42: Edge pair similarity computation: A pair of edges in the respective graphs is denoted by $P_{ij,i'j'}^e=(e_{ij},e_{i'j'})$. The similarity of an edge pair is defined in a way similar to correspondence similarity. To incorporate the scale change of G and G', for a given scaler τ a real value which takes into account the possibility of a difference in scale between two images of a given eye), we define the similarity of an edge pair $(e_{ij},e_{i'j'})$ as:

$$S_{ij,i'j'}^e(\tau) = \begin{cases} 1 - \frac{(l_{ij} - \tau l'_{i'j'})^2}{\sigma_g^2} & \text{if } |l_{ij} - \tau l'_{i'j'}| < \sigma_g \\ 0 & \text{otherwise} \end{cases}$$

where $\sigma_g$ is a predefined tolerance parameter to take into account the possibility of noise. Note that in other embodiments or for higher accuracy, the length of an edge can be defined not by the Euclidean distance but instead by using router information between two vertices. Router information means information which takes into account the connectivity of two vertices. For example, if the length of an edge is represented not as Euclidean distance between its end points but instead as a "Manhattan distance" (city block distance), then the router information is used.

In this case we can define the similarity of a given correspondence pair $P_{ii',jj'}^c=(c_{ij},c_{i'j'})$ at a given scaler τ as:

$$S_{ii',jj'}^c(\tau) = \begin{cases} S_{ij,i'j'}^e(\tau) S_{ii'}^v S_{jj'}^v & \text{if } i \neq i' \text{ and } j \neq j' \\ 0 & \text{if } i = j \text{ or } i' = j' \end{cases}$$

Then, we obtain a symmetric and nonnegative similarity matrix of all the selected correspondences in space ζ with a given scaler τ, denoted as A(τ), where $A_{ij}(\tau)=S_{ii',jj'}^c(\tau)$.

Sub-step 43: Best sub-graph matching: The embodiment builds a similarity graph $\Omega=(\zeta,\epsilon)$ using all of the n possible correspondences as the vertices and $A(\tau)$ as the weighted adjacency matrix. We use a common way to represent a cluster of vertices by associating a (nonnegative real-valued) n dimensional vector to it, where its components express the participation of nodes in the cluster: If a component has a small value, then the corresponding node is weakly associated with the cluster, whereas if it has a large value, the node is strongly associated with the cluster. Components corresponding to nodes not participating in the cluster are zero.

A good cluster is one where elements that are strongly associated with it also have large values connecting one another in the similarity matrix. We define an intra-cluster affinity score by $$\omega(\tau) = \frac{1}{n^2} \sum_{i,j \in \zeta} A_{ij}(\tau).$$

A plurality of candidate values for $\tau$ are tried to find an optimal value $\tau_0$ having the highest intra-cluster affinity score. Hence, for the "optimal" sub-graph matching at the correct scale $\tau_0$, it corresponds to a high average intra-cluster affinity score $$\omega(\tau_0) = \frac{1}{n^2} \sum_{i,j \in \zeta} A_{i,j}(\tau_0).$$

Then the average intra-cluster affinity score can be rewritten in a quadratic form, $$\omega(\tau_0) = \frac{1}{n^2} \sum_{i,j \in \zeta} A_{i,j}(\tau_0) = \frac{1}{n^2} x^T A(\tau_0) x,$$

where $x \in R^n$, $x \geq 0$ is the "indicator vector".

Then the problem become to find a vector x that maximizes $(\omega(\tau_0)$. However, note that the objective function requires some normalization of the components of x, since only the relative values between the elements of x matter, we can add a L2-norm constraint $|x|_2=1$.

In the experimental implementation of the embodiment, we used a L2-norm constraint instead of a L1-norm constraint, mainly because we wanted to obtain a one-to-one mapping between two sets of points, whereas a L1-norm constraint allows multi-to-multi mapping; furthermore, we can use a fast solver to solve this problem with a L2-norm constraint. In other applications, a L1-norm constraint can be used for (multiple) sub-graph matching. This can be used to perform step 14, and we also have a rapid solver for the L1-norm case.

If the constraint is $|x|_2=1$, then we can get the following standard quadratic program, which is a generalization of the so-called Motzkin-Straus program:

$$\max f(x)=x^T A(\tau_0) x \, s.t. \, x \in \Delta$$

where $\Delta=\{x \in R^n: x \geq 0 \text{ and } |x|_2=1\}$.

By the Raleigh's ratio theorem, $x^*$ that will maximize $f(x)$ is the principal eigenvector of A. Since A has non-negative elements, by the Perron-Frobenius theorem, the elements of $x^*$ will be in the interval [0, 1]. Therefore, the graph/sub-graph matching problem becomes one of finding the main cluster from the similarity graph, and this can be solved easily using the well-known eigenvector decomposition technique. For speed considerations, we use power iteration to calculate the approximate solution. We denote the maximum value of $f(x)$ by $S_{max}(\tau)$.

Sub-step 44: The similarity of two given graphs (G,G') with a given scaler $\tau$ is computed as $$sim(G, G', \tau) = S_{max}(\tau) \frac{|V_m||V'_m|}{|V||V'|},$$

where $|V_m|$ and $|V_m'|$ represent the matched vertices in G and G', respectively, such that $|V_m|=|V_m'|$.

When the first embodiment is being used to perform identification (i.e. verifying a suspected identity of the person from whom retina image 1 was collected), based on a new captured retina image 1 (referred to as a testing image) and the ID# of the suspected identity, the embodiment first fetches the Preference images (K=3 in the test) corresponding to this ID from the enrolled database 5, and then computes the similarities of the testing image with the reference images. The decision 6 is made by comparing the fusion similarity (e.g. minimum, maximum, mean or median of the K similarities) with a predefined threshold $t_{ID}$.

When the first embodiment is being used to perform recognition (i.e. to determined which ID describes the identity of the person from whom the retina image 1 was obtained), then, similarly to identification, the first embodiment first computes the fusion similarities with all of the enrolled identities, and then compares the maximum of these similarities with a rejection threshold $t_{RG}$. If the maximal similarity is less than $t_{RG}$ then make decision 6 is that the person is 'unknown'. Otherwise, the decision 6 is the corresponding personal id with the maximum similarity.

In either case, when there are a plurality of retina images of the person, and/or a plurality of retina images in the database of a given individual, a similarity value may be calculated by the methods above pairwise for each combination of an image of the person and a corresponding image of the individual, and then an average of calculated similarity values is computed, to give a single similarity value.

What is claimed is:

1. A computational method of obtaining a similarity value indicative of a similarity between a first retina image and a second retina image, the method comprising:
   (i) a computer processor deriving a plurality of transform invariant points in the first retina image, each derived point being associated with a transform invariant score;
   (ii) the computer processor using an over-segmentation algorithm to segment the first retina image into a set of non-overlapping super-pixel regions;
   (iii) for each super-pixel region, the computer processor selecting a sub-set of said points having the highest transform invariant scores;
   (iv) the computer processor generating a first graph, the first graph having vertices and edges, the vertices corresponding to respective ones of the selected sub-sets of transform invariant points in the super-pixel regions of the first retina image, and each edge connecting a respective pair of the vertices, each of the vertices being associated with a descriptor vector which is informative about features of a part of the first retina image proximate the corresponding point in the respective super-pixel region of the first retina image; and (v) the computer processor comparing the first graph with a second graph derived from the second retina image, to generate said similarity value.

2. A computational method according to claim 1 including the computer processor deriving a connectivity of said super-pixel regions, the edges of the first graph being defined in accordance with said connectivity.

3. A computational method according to claim 1 in which the first and second graphs are defined in a common space, and each of the first and second graphs are centrally aligned in the common space.

4. A computational method according to claim 1 in which the descriptor vector comprises scale-invariant transform data.

5. A computational method according to claim 1 in which the descriptor vector includes at least one of local binary pattern (LBP), histogram of oriented gradients (HOG) and color histogram features.

6. A computational method according to claim 1 including in said step of the computer processor comparing the first graph and the second graph,
   (a) deriving a plurality of possible correspondences between the vertices of the first graph and the vertices of the second graph; and
   (b) for each said correspondence, deriving a similarity value using the corresponding descriptor vectors of the vertices of the first and second graphs.

7. A computational method according to claim 6, sub-step (b) further including a comparison of the lengths of the corresponding edges of the first and second graphs.

8. A computational method according to claim 6 in which sub-step (b) includes sub-graph matching.

9. A computational method according to claim 8, wherein the sub-graph is a non-completed graph.

10. A computational method according to claim 1 in which the transform invariant points are affine transform invariant points.

11. A computational method according to claim 1, wherein
   said first retina image is a retina image of a person and said second retina image is a retina image of an individual,
   the method further comprising the computer processor:
   determining whether the person is or is not the individual according to whether the similarity value is respectively above or below a threshold; and
   outputting a value according to said determination.

12. A computational method according to claim 1, wherein
   said first retina image is an image of a person; and
   steps (i) to (v) are performed for a plurality of said second retina images, each said second retina image being a retina image of a corresponding one of a set of individuals;
   the computational method further including:
   if none of the similarity values is above a threshold, generating a decision value indicating that the person is not one of the individuals;
   otherwise, generating a decision value indicating that the person is the individual having the highest similarity value; and
   outputting said decision value.

13. A computational method according to claim 1 wherein said first retina image is an retina image of a person and steps (i) to (v) are performed for a plurality of said second retina images, said second retina images including images of healthy and unhealthy eyes;
   the method further including outputting the similarity value.

14. A computational method according to claim 13 which is performed region-by-region on the at least one first retina image of the person, to obtain data indicating which of the super-pixel regions are suggestive of the presence of the eye disease.

15. A computational method according to claim 1 wherein said first retina image is a retina image of a person and second retina image is a retina image of the same person at least a week earlier;
   the method further including outputting the similarity value.

16. A computational method according to claim 15 which is performed region-by-region on the at least one retina image of the person, to obtain data indicating which of the super-pixel regions are suggestive of the presence of an eye disease.

17. A computational method according to claim 1, wherein the computer processor compares the first graph with the second graph at a predetermined scaler to generate said similarity value.

18. A retina image comparison system comprising a processor and a tangible data storage device, the data storage device storing processor instructions operative upon being performed by the processor to cause the processor to obtain a similarity value indicative of a similarity between a first retina image and a second retina image, by:
   (i) deriving a plurality of transform invariant points in the first retina image, each derived point being associated with a transform invariant score;
   (ii) using an over-segmentation algorithm to segment the first retina image into a set of non-overlapping super-pixel regions;
   (iii) for each super-pixel region, selecting a sub-set of said points having the highest transform invariant scores;
   (iv) generating a first graph, the first graph having vertices and edges, the vertices corresponding to respective ones of the selected sub-sets of transform invariant points in the super-pixel regions of the first retina image, and each edge connecting respective pair of the vertices, each of the vertices being associated with a descriptor vector which is informative about features of a part of the first retina image proximate the corresponding point in the respective super-pixel region of the first retina image;
   (v) comparing the first graph with a second graph derived from the second retina image, to generate said similarity value.

19. A non-transitory computer-readable medium storing processor instructions operative upon being performed by a processor to cause the processor to obtain a similarity value indicative of a similarity between a first retina image and a second retina image, by:
   (i) deriving a plurality of transform invariant points in the first retina image, each derived point being associated with a transform invariant score;
   (ii) using an over-segmentation algorithm to segment the first retina image into a set of non-overlapping super-pixel regions;
   (iii) for each super-pixel region, selecting a sub-set of said points having the highest transform invariant scores;
   (iv) generating a first graph, the first graph having vertices and edges, the vertices corresponding to respective ones of the selected sub-sets of transform invariant points in the super-pixel regions of the first retina image, and each edge connecting respective pair of the vertices, each of the vertices being associated with a descriptor vector which is informative about features of a part of the first retina image proximate the corresponding point in the respective super-pixel region of the first retina image;

(v) comparing the first graph with a second graph derived from the second retina image, to generate said similarity value.

* * * * *